United States Patent
Tobiishi

(10) Patent No.: US 7,369,744 B2
(45) Date of Patent: May 6, 2008

(54) SIGNAL RECEIVING APPARATUS AND SIGNAL RECORDING METHOD

(75) Inventor: Toshiharu Tobiishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 10/686,571

(22) Filed: Oct. 17, 2003

(65) Prior Publication Data

US 2004/0101280 A1 May 27, 2004

(30) Foreign Application Priority Data

Oct. 17, 2002 (JP) ............... 2002-302970

(51) Int. Cl.
- *H04N 7/00* (2006.01)
- *H04N 9/79* (2006.01)
- *H04N 5/91* (2006.01)
- *H04N 5/00* (2006.01)
- *H04N 5/50* (2006.01)
- *H04N 7/173* (2006.01)
- *H04B 1/18* (2006.01)

(52) U.S. Cl. ............... 386/46; 386/45; 386/66; 386/125; 386/126; 348/731; 348/732; 455/171.1; 455/179.1; 725/109; 725/110

(58) Field of Classification Search ............... 386/46, 386/45, 66, 125, 126; 348/731, 732; 455/171.1, 455/179.1, 181.1, 185.1, 186.1; 725/109, 725/110, 133, 134, 139, 140, 141, 142, 153
See application file for complete search history.

(56) References Cited

U.S. PATENT DOCUMENTS

| | | | |
|---|---|---|---|
| 5,543,933 A * | 8/1996 | Kang et al. ............... 386/83 |
| 5,546,193 A | 8/1996 | Hailey et al. ............... 358/335 |
| 5,748,263 A | 5/1998 | Ball ............... 348/734 |
| 5,771,329 A * | 6/1998 | Yun ............... 386/46 |
| 5,917,991 A | 6/1999 | Ogawa ............... 386/117 |
| 5,987,213 A | 11/1999 | Mankovitz et al. ............... 386/83 |
| 6,317,882 B1 * | 11/2001 | Robbins ............... 725/34 |
| 6,751,397 B1 | 6/2004 | Yoshida et al. ............... 386/46 |
| 6,754,436 B1 | 6/2004 | Shinagawa et al. ............... 386/83 |
| 6,792,617 B2 * | 9/2004 | Gorbatov et al. ............... 725/110 |
| 6,802,074 B1 * | 10/2004 | Mitsui et al. ............... 725/25 |
| 2003/0035647 A1 * | 2/2003 | Son et al. ............... 386/83 |
| 2003/0159147 A1 * | 8/2003 | Young et al. ............... 725/47 |

FOREIGN PATENT DOCUMENTS

| | | |
|---|---|---|
| CN | 1066356 A | 11/1992 |
| CN | 1128096 A | 7/1996 |

(Continued)

*Primary Examiner*—Thai Q. Tran
*Assistant Examiner*—Syed Y. Hasan
(74) *Attorney, Agent, or Firm*—Fitzpatrick, Cella, Harper & Scinto

(57) ABSTRACT

A signal receiving apparatus includes a tuner (102) for selecting a broadcasting station or a program, which becomes a reception subject, a program recording/playing circuit (202) for recording a received signal of the reception subject, and a control unit (109) for controlling start of recording a signal on the program recording/playing circuit (202). The control unit (109) controls the program recording/playing circuit (202) by using a fact that a selected time over which the reception subject has been selected exceeds a predetermined time, as a condition under which recording is started. Even if the user does not conduct operation for starting recording, therefore, recording can be started.

8 Claims, 9 Drawing Sheets

FOREIGN PATENT DOCUMENTS

| | | |
|---|---|---|
| CN | 1236264 A | 11/1999 |
| JP | 6-014289 | 1/1994 |
| JP | 11-283293 | 10/1999 |
| JP | 2001-076395 | 3/2001 |
| JP | 2001-136470 | 5/2001 |
| JP | 2002-112156 | 4/2002 |
| KR | 1998-038730 | 8/1998 |
| WO | WO 94/28676 | 12/1994 |

* cited by examiner

FIG. 3

| 301 | 302 |
|---|---|
| 1 | 30 SECONDS BEFORE |
| 2 | 1 MINUTE BEFORE |
| ⋮ | ⋮ |
| n | CANCELED |

FIG. 5
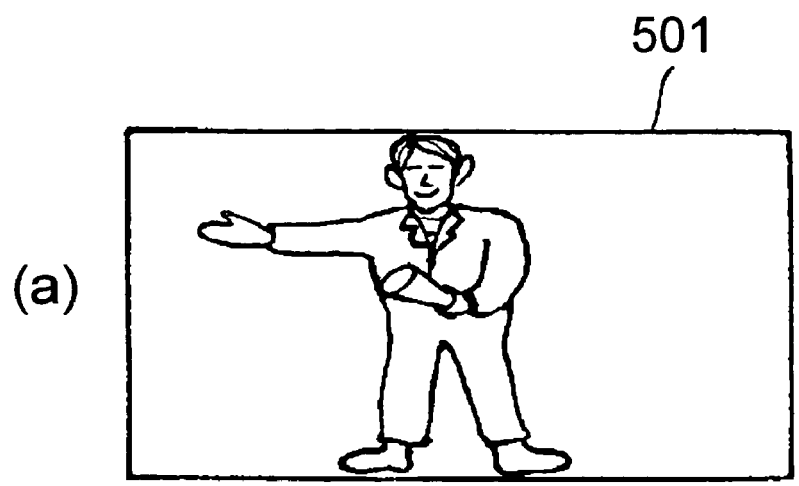
(a)
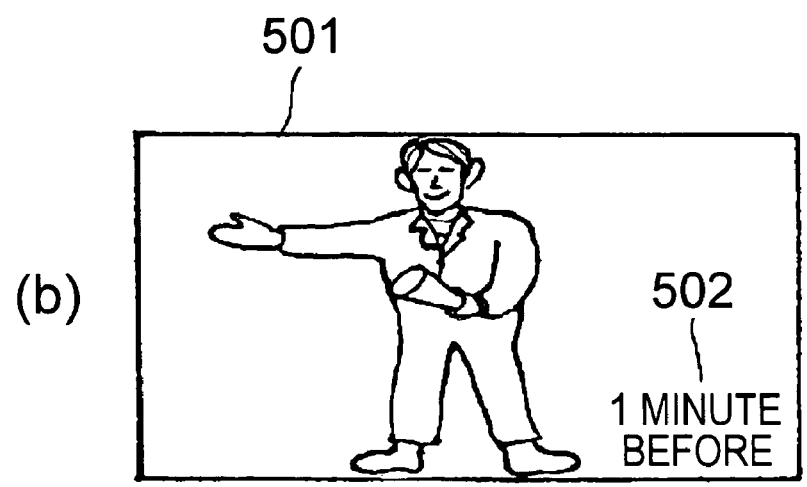
(b)
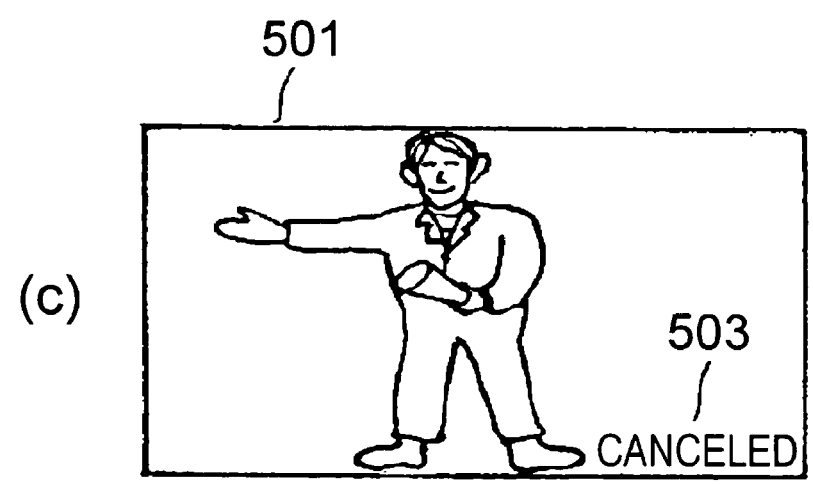
(c)

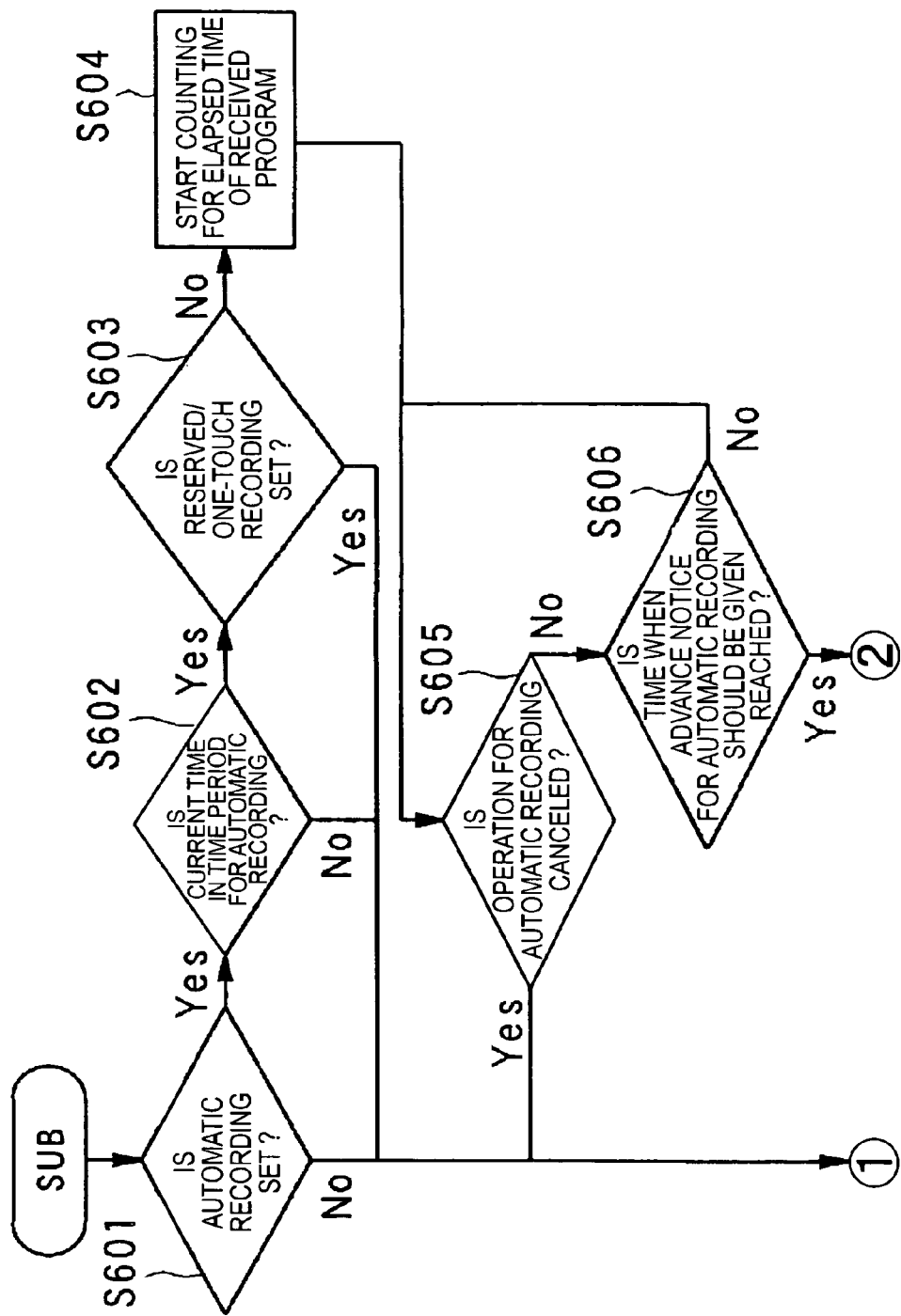

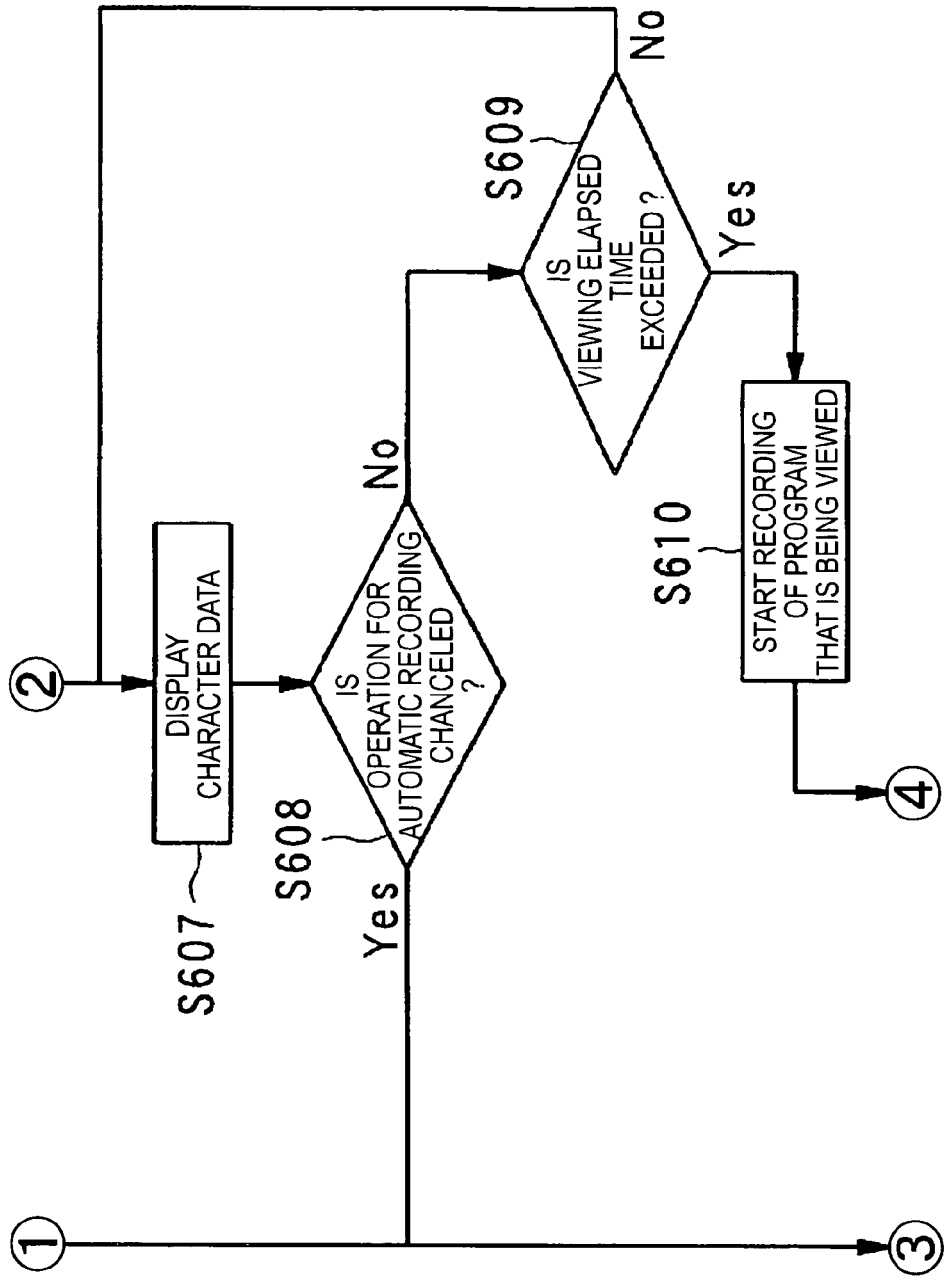

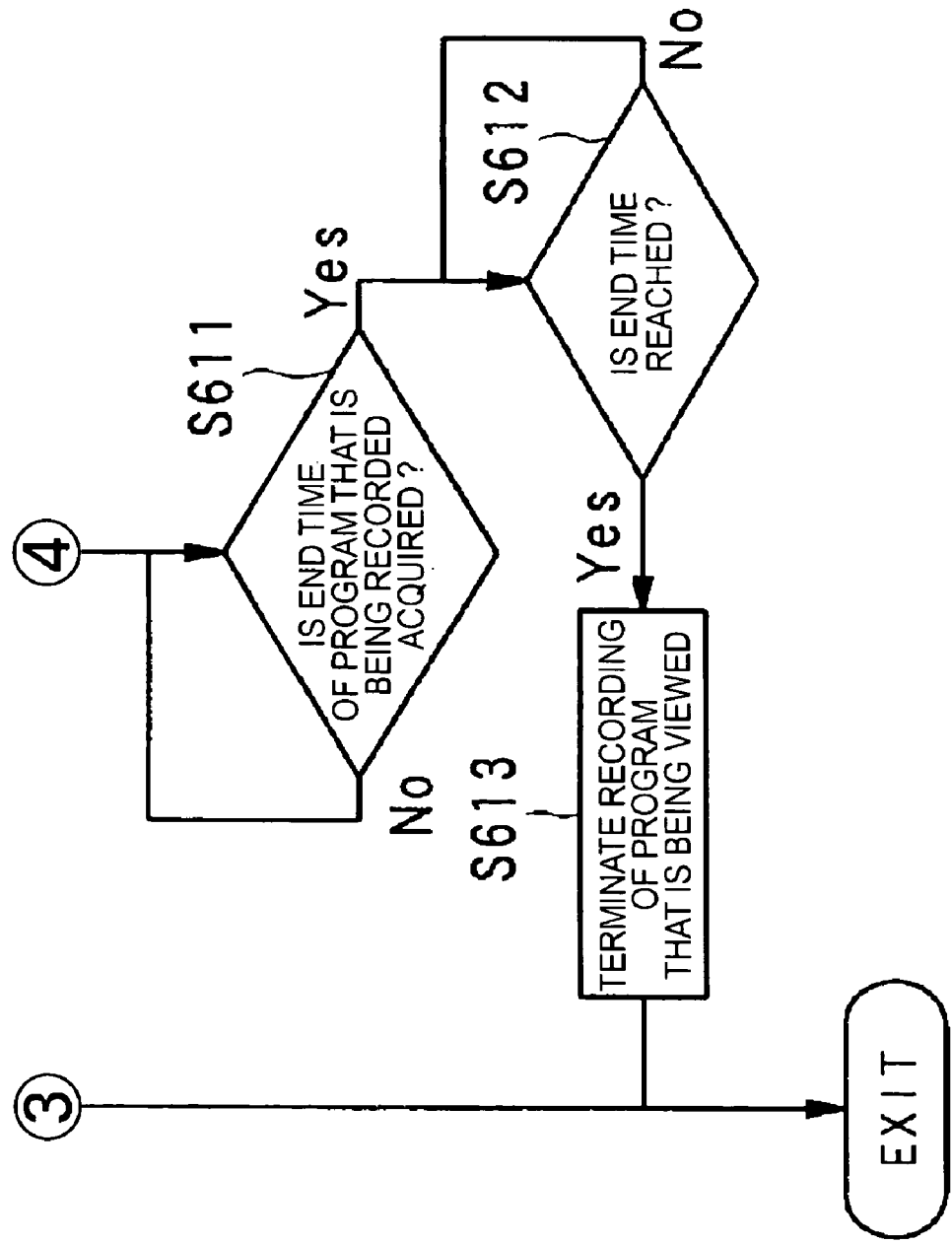

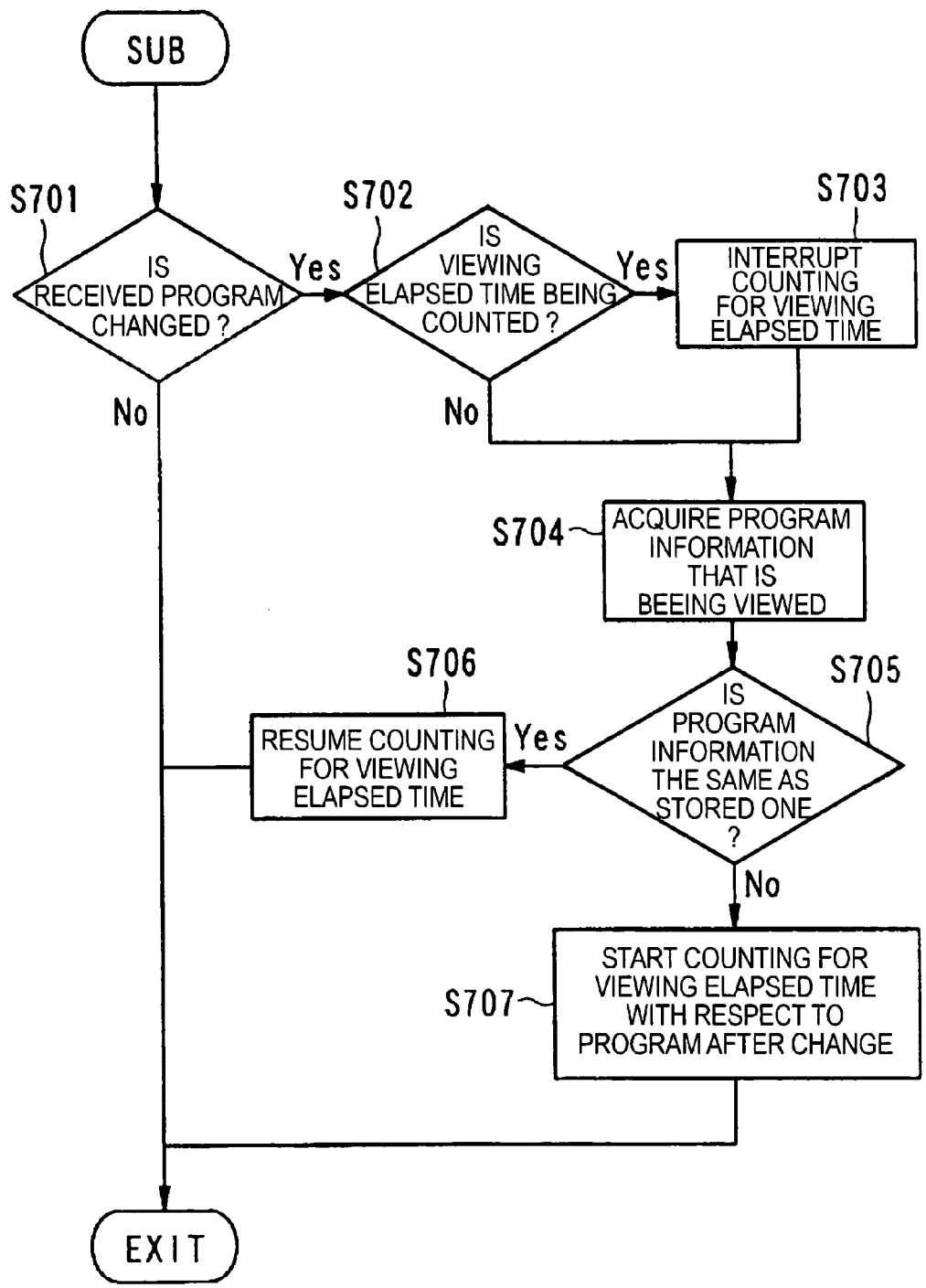

SIGNAL RECEIVING APPARATUS AND SIGNAL RECORDING METHOD

BACKGROUND OF THE INVENTION

1. Field of the Invention

The present invention relates to a signal receiving apparatus, and relates to a signal recording method. In particular, the present invention relates to an invention that can be suitably applied to a TV receiving apparatus. Furthermore, the present invention relates to an invention that can be suitably implemented in a receiving apparatus capable of receiving a broadcast wave with program information such as program start time/program end time and a program title, superposed.

2. Description of the Related Art

As a conventional video recording method for TV broadcast wave, there are absence video recording (video recording reservation) using a timer, and one-touch video recording for which operation is conducted by using a remote controller or the like when leaving the TV.

The following TV receiving apparatus has been proposed in Japanese Patent Application Laid-Open (JP-A) No. 6-14289. In the case where a viewer leaves the TV while viewing a program, order information for pausing the displayed image is issued by key operation on a remote controller or the like, and video recording of the program is started from a point of time at which the image has been paused.

Thereafter, the viewer returns to the TV. When operation for canceling the image pause state has been conducted, the recorded program is played from the point of time at which program recording was started.

The technique described in JP-A No. 6-14289 concerns a TV receiving apparatus for video recording on a program which is being viewed in response to key operation conducted on a remote controller or the like when the viewer leaves the TV, and playing the recorded program from the point of time at which video recording was started, after the viewer has returned to the TV. However, there is, for example, the following problem. When there is a sudden telephone call or a sudden visitor while a viewer is viewing a program the viewer has looked forward to, the viewer conducts one-touch video recording. Since the viewer loses himself or herself in the talk over the telephone or with a visitor, however, the viewer might have a long talk and forget that the viewer started one-touch video recording. This results in a problem that a program subsequent to the program subjected to one-touch video recording is recorded successively.

In the case of a sudden telephone call or visitor, the viewer often receives the call or visitor without being able to conduct one-touch video recording because of immediate response, and the viewer cannot watch the program. Or the viewer might lose himself or herself in the talk, and reach the climax of the program without understanding the contents of the program the viewer has viewed.

In addition, the viewer might sleep while viewing a long program such as a movie or a drama. In this case, the viewer might overlook the climax of the program the viewer has viewed, or an image continues to flow even after the program has finished, resulting in wasteful electric power consumption.

SUMMARY OF THE INVENTION

An object of the present invention is to provide a signal receiving apparatus and a signal recording method whereby recording can be started even if the user does not conduct operation for stating the recording.

A signal receiving apparatus according to the present invention includes a selection circuit for selecting a reception subject, a recording device for recording a received signal of the reception subject, and a control unit for controlling start of recording a signal on the recording device. The control unit starts recording of the signal on the recording device on condition that a selected time over which the reception subject has been selected exceeds a predetermined time.

According to this configuration, recording can be started when selected time has exceeded the predetermined time, without conducting start operation of the recording by the user.

BRIEF DESCRIPTION OF THE DRAWINGS

In the accompanying drawings:

FIG. 3 is a concept diagram of an example of data stored in a memory 206 in the TV receiving apparatus shown in FIG. 1;

FIG. 5 is a schematic diagram of a picture displayed on a CRT 106 in the TV receiving apparatus shown in FIG. 1;

FIGS. 6A, 6B and 6C are flow charts showing operation conducted by a control circuit 209 as regards video recording and character information output, in the TV receiving apparatus shown in FIG. 1; and FIG. 7 is a flow chart showing operation conducted by the control circuit 209 as regards the counter 210 at the time of channel switching, in the TV receiving apparatus shown in FIG. 1.

DESCRIPTION OF THE PREFERRED EMBODIMENTS

Figure 1:
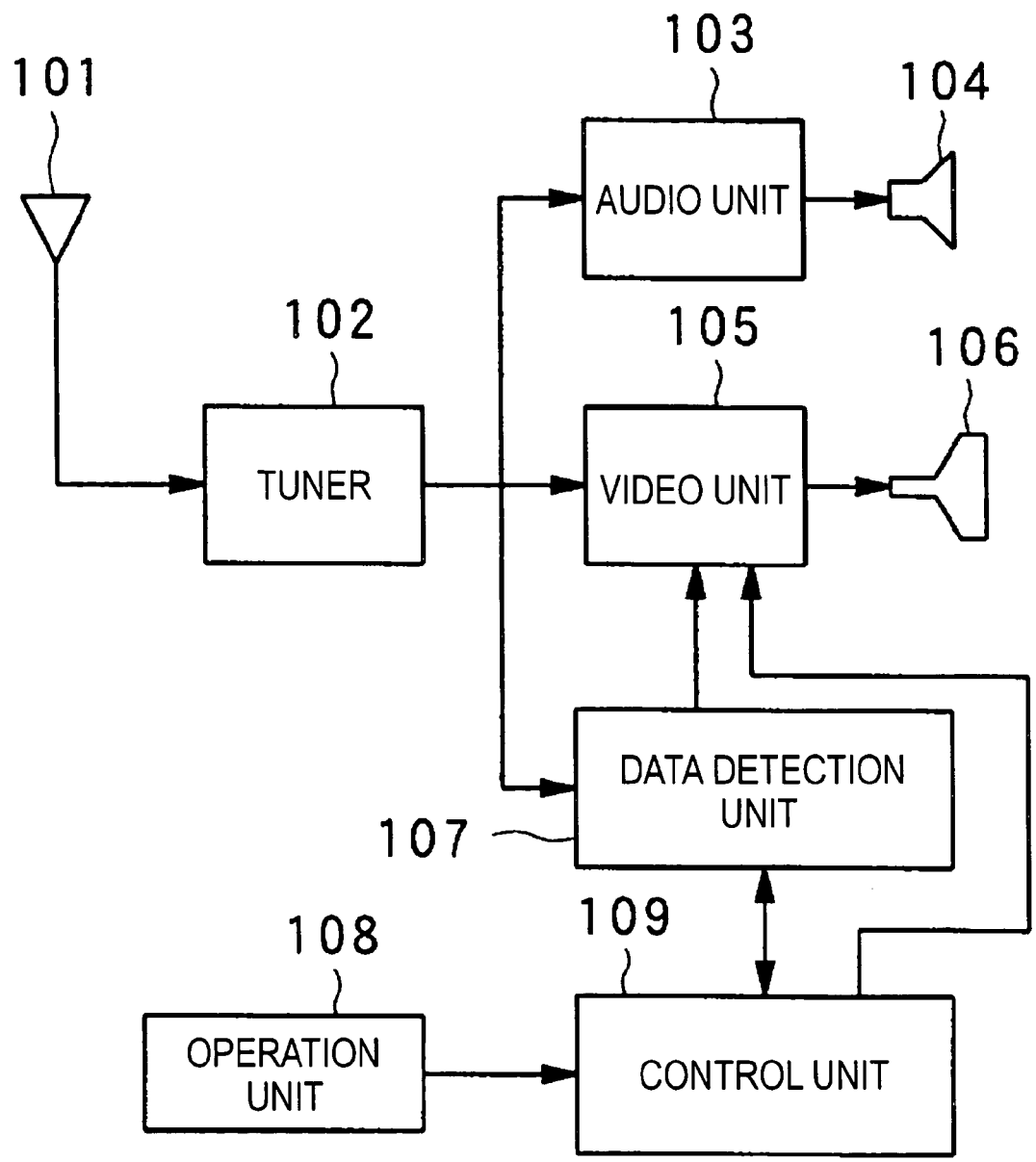
FIG. 1 is a block diagram showing a configuration of a TV receiving apparatus to which an embodiment of a signal receiving apparatus according to the present invention has been applied.

A signal receiving apparatus according to the present invention includes a selection circuit for selecting a reception subject, a recording device for recording a received signal of the reception subject, and a control unit for controlling start of recording a signal on the recording device. The control unit controls the recording device by using a fact that a selected time over which the reception subject has been selected exceeds a predetermined time, as a condition under which recording of the signal on the recording device is started.

As a configuration of this signal receiving apparatus, the following configuration can be suitably adopted. For example, the above-described predetermined time can be arbitrarily set. Such a configuration that the user can set the predetermined time is desirable.

As the predetermined time, a time of at least 10 seconds can be suitably adopted.

In particular, such a configuration that the user can set a time of at least 10 seconds as the predetermined time is suitable. If the predetermined time is short, a recording start condition based on the selected time is frequently satisfied. By adopting a time of at least 10 seconds, however, a recording device can be prevented from frequently starting its operation.

Such a configuration that the subject of reception is a broadcasting station and the selected time is time during which a broadcast signal broadcasted by the broadcasting station is selected and received can be suitably adopted.

Preferably, the present invention is implemented as a receiving apparatus for receiving a broadcast from a TV broadcasting station or a radio broadcasting station. Preferably, the present invention can also be applied to a configuration that receives a signal transmitted from a predetermined storage apparatus on a network, besides a signal broadcasted from a TV broadcasting station or a radio broadcasting station, such as a receiving apparatus for a signal supplied in a video-on-demand system or a receiving apparatus for a stream signal supplied by specifying a predetermined address on the Internet.

Such a configuration that the subject of reception is a broadcasted program and the selected time is time during which a broadcast signal of the program is being received can be suitably adopted.

Such a configuration that the subject of reception is a broadcasted program and the control unit effects control to terminate recording when the program for which recording was started has finished can be suitably adopted. The end of the program can be sensed on the basis of program information. Such a configuration that the end of the program can be sensed on the basis of program information sent together with the signal to be recorded, or such a configuration that the end of the program can be sensed on the basis of program information sent via a transmission path different from that for the signal to be recorded can be adopted.

As for the control unit, such a configuration that recording is started on the condition that at least any of the reception subject information, reception date, a day of the week for reception and reception time satisfies a predetermined requirement can be suitably adopted.

The selected time can be measured by using a time measuring circuit such as a counter.

It is also preferable to adopt the satisfaction of predetermined requirements by a preset broadcasting station, program genre, program title and reception time besides the selected time, as the recording start condition. In this case, such a configuration that measurement of the selected time and judgment on other conditions are conducted separately and an OR function is performed on those conditions is performed, or such a configuration that the measurement of the selected time is not conducted or suspended when a condition other than the selected time does not satisfy the recording start condition can be adopted.

It is also possible to adopt a decision whether reception subject information satisfies a predetermined requirement as the condition other than the selected time. As the reception subject information, for example, information identifying a broadcasting source (such as a selected channel number in TV broadcasting etc.), the program genre and a performer name can be adopted.

As for the control unit, such a configuration that the recording is started on the condition that a requirement set by the user besides the selected time is satisfied can be suitably adopted. For example, such a configuration that the user can set conditions such as the reception subject information, reception date, a day of the week of reception and reception time, other than the selected time, can be preferably adopted.

By the way, a configuration including a perception generating device to generate perception of a received signal can be suitably adopted. It is suitable that the perception generating device can stop its operation separately from the operation of the recording device.

Specifically, wasteful operation of the perception generating device can be suppressed by stopping the operation of the perception generating device when the selected time has exceeded a predetermined time (which may be the same as the predetermined time for the recording start condition, but it is desirable to adopt a predetermined time longer than the predetermined time for the recording start condition) or a predetermined time has been exceeded since the recording is started.

Herein, the term "generating perception of a signal" means generating a stimulus to a sensory organ of a living thing including a human being on the basis of the signal, or controlling the degree of the stimulus on the basis of the signal.

As the perception generating device, especially a vision generating (visualizing) device or an auditory sense generating device can be suitably adopted.

In the case where the received signal is an image signal, a display device, which is a vision generating device, can be adopted. In the case where the received signal is a voice signal, a vibrator (such as a speaker or a headphone), which is an auditory sense generating device, can be adopted.

Furthermore, a configuration having a circuit for generating perception of the start of the recording or advance notice of the recording start can be suitably adopted. The control circuit may also function as this circuit.

Specifically, it suffices to effect control so as to store information to be subject to perception generation, and read out the information and generate perception of the information when starting the recording or giving a notice of recording start.

The present invention includes an invention of a signal recording method comprising a process for selecting a reception subject, and a process for recording a received signal of the reception subject. In the recording process, recording of the signal is started on condition that a selected time over which the reception subject has been selected exceeds a predetermined time.

Hereafter, a preferred embodiment in which the present invention has been applied to a TV receiving apparatus will be described in detail with reference to the drawings. Unless specially stated, however, it is not intended that dimensions, materials, shapes and relative arrangements of components stated in the description of the embodiments restrict the scope of the present invention.

In the ensuing drawings, components similar to those shown in the drawings referenced in the foregoing description are denoted by the same numerals. The ensuing description of a TV receiving apparatus to which an embodiment of a signal receiving apparatus according to the present invention has been applied serves as description of an embodiment of a signal recording method according to the present invention as well.

(An Embodiment of Signal Receiving Apparatus)

A TV receiving apparatus to which an embodiment of a signal receiving apparatus according to the present invention has been applied will now be described with reference to FIG. 1. FIG. 1 is a block diagram showing a configuration of a TV receiving apparatus to which an embodiment of a signal receiving apparatus according to the present invention has been applied.

As shown in FIG. 1, a TV receiving apparatus to which an embodiment of a signal receiving apparatus according to the present invention has been applied includes an antenna 101, a tuner 102 serving as a selection circuit, an audio unit 103, a speaker 104, a video unit 105, a CRT 106, a data detection unit 107, an operation unit 108, and a control unit 109.

The tuner 102 demodulates a TV broadcast wave, such as a broadcast wave having audio information and video information of a program with program information superposed thereon, or an analog broadcast wave having audio information with program information superposed thereon, to an intermediate frequency signal, conducts video detection, and outputs respective kinds of information to the audio unit 103, the video unit 105 and the data detection unit 107.

The audio unit 103 converts the audio information to demodulated audio information, and outputs the demodulated audio information to the speaker 104.

Figure 2:
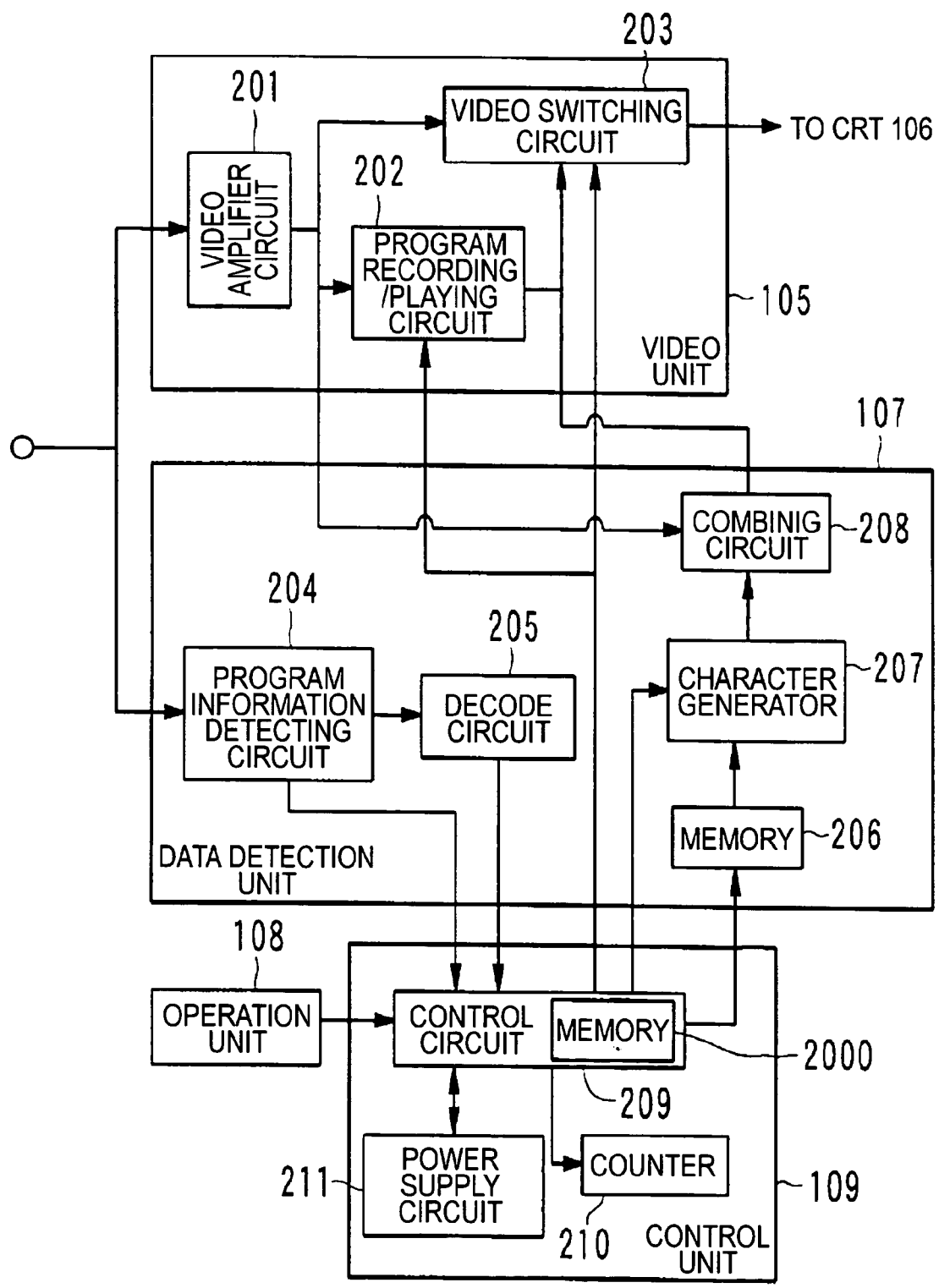
FIG. 2 is a block diagram of a video unit 105, a data detection unit 107 and a control unit 109 shown in FIG. 1.

As shown in FIG. 2, the video unit 105 includes a video amplifier circuit 201 for demodulating video information included in the signal detected by the tuner 102 and conducting video processing, a program recording/playing circuit 202 for recording/playing video information subjected to the video processing in the video amplifier circuit 201, and a video switching circuit 203 for conducting switching among the video information subjected to the video processing in the video amplifier circuit 201, the video information obtained by playing a program recorded by the program recording/playing circuit 202, and video information obtained by combining in a combining circuit 208 under the control of a control circuit 209 and outputting resultant video information to the CRT 106.

As shown in FIG. 2, the data detection unit 107 is provided with a program information detecting circuit 204 for detecting coded program information from the intermediate frequency signal detected by the tuner 102 and notifying the control circuit 209 that a program title, program start/end time and a channel number included in the program information have been detected, a decode circuit 205 for decoding program information detected by the program information detecting circuit 204, a memory 206 for storing character data, which gives advance notice that a program viewing accumulation time preset by the viewer is approaching and automatic video recording will be started, a character generator 207 for converting the character data stored in the memory 206 to video information and outputting the resultant video information to the combining circuit 208, and the combining circuit 208 for combining the video information subjected to the video processing and output from the video amplifier circuit 201 with the character information converted to the video information in the character generator 207 and outputting the combined video information to the video switching circuit 203. FIG. 2 is a block diagram of the video unit 105, the data detection unit 107 and the control unit 109 shown in FIG. 1.

The operation unit 108 makes possible input operations, such as setting of viewing elapsed time (selected time) serving as an automatic recording start condition, ordering a recording suspension when start of the automatic video recording is displayed, setting of reservation/one-touch recording and playing for the program recording/playing circuit 202, switching between on/off of the power switch, setting of a time period over which automatic recording should be conducted, and switching of a program received by the antenna 101 (change of the subject to be received).

Furthermore, operation for start and suspension of arbitrary recording, which is not automatic recording, is also made possible. Furthermore, it is also made possible to set and change the character data stored in the memory 206 (details of which will be described later). As the operation unit 108, a configuration allowing remote operation (the remote controller), a touch panel, a key switch or the like installed on the receiving apparatus can be used.

The control unit 109 shown in FIG. 1 will now be described with reference to FIG. 2. As described earlier, FIG. 2 is a detailed block diagram of the video unit 105, the data detection unit 107 and the control unit 109, shown in FIG. 1.

As shown in FIG. 2, the control unit 109 includes the control circuit 209. The control circuit 209 conducts control for a decision on a result supplied from the program information detecting circuit 204, a decision on the kind of program information demodulated by the decode circuit 205, outputting a control signal for controlling a character data output position and so on to the character generator 207, control on switching of video information input to the video switching circuit 203 (video information subjected to the video processing, video information obtained by playing a program recorded by the program recording/playing circuit 202, or video information obtained by the combining function), ordering the memory 206 to output the character data stored therein, sensing whether there is automatic recording setting, a decision based on comparison between program information concerning the program for which the counting for the selected time is conducted by the counter 210 serving as a time measuring circuit and program information concerning the program input by the tuner 102, storage of the program information concerning the program for which the counting for the selected time is conducted by the counter 210, and ordering the counter 210 to conduct counting. The control circuit 209 includes a memory 2000 for storing a result of the counting and program information.

The control unit 109 further includes the counter 210 for conducting counting to measure the viewing elapsed time for a program that the viewer is viewing, and a power supply circuit 211. The power supply circuit 211 includes a supply unit for supplying electric power to the tuner 102, the data detection unit 107 and the control unit 109, which conduct TV broadcast wave inputting and program information detection/storage whether the power switch is on/off, and a supply unit for supplying electric power to other portions in synchronism with the turning on/off of the power switch.

Hereafter, the present embodiment will be described in more detail. With reference to FIG. 1, the tuner 102 selects a TV broadcast wave received by an antenna 101, such as a broadcast wave having audio information and video information with program information superposed thereon, or an analog broadcast wave having audio information with video information superposed thereon, converts the audio information, the video information and the program information to an intermediate frequency signal, demodulates respective kinds of information, and outputs respective kinds of information to the audio unit 103, the video unit 105 and the data detection unit 107. Supposing that the program information is superposed on the audio information and the video information, the present embodiment will now be described. However, the present invention is not restricted to such a case. For example, such a configuration that the program information is not superposed on the audio information and the video information, but is received from a different medium may be adopted. It is supposed to access a site of a program information magazine or a TV station via the Internet using a telephone line or the like and receive necessary program information from the site, input information such as program information in an analog way, and directly input program information by using a bar code (G code) or the like.

The audio unit 103 demodulates the audio information, then conducts audio processing, and outputs the audio information subjected to the audio processing to the speaker 104.

The data detection unit 107 detects information concerning program information, such as the program title and the program start/end time, from information supplied from the tuner 102, and conducts conversion of the information concerning program information to video information.

The video unit 105 conducts switching among the video information received by the tuner 102 and subjected to the video processing, the video information obtained by combining in the data detection unit 107, and the video information obtained by playing a recorded program, and outputs resultant video information to the CRT 106 serving as video display means.

The control unit 109 conducts control for a decision on a result detected by the data detection unit 107, video information switching, supply of power to respective circuits, and conducting counting to measure the viewing elapsed time for the program that the viewer is viewing.

With reference to FIG. 2, the TV broadcast wave input by the tuner 102 is demodulated to an intermediate frequency signal and subject to video detection.

The video amplifier circuit 201 demodulates video information included in the signal subjected to the video detection in the tuner 102, and conducts video processing on the demodulated video information.

The program recording/playing circuit 202 which is the recording device records the video information demodulated by the video amplifier circuit 201 by means of reserved recording, one-touch recording, or automatic recording according to the viewing elapsed time (selected time) for a program or a channel that the viewer is viewing, and outputs played video information to the video switching circuit 203.

The video switching circuit 203 switches among the video information subjected to video processing in the video amplifier circuit 201, the video information played in the program recording/playing circuit 202, and the video information combined with the character data in the combining circuit 208 according to the control signal supplied from the control circuit 209, and outputs the switched video information to the CRT 106.

The program information detecting circuit 204 detects coded program information such as the program title and the program start/end time from the intermediate frequency signal detected by the tuner 102, and notifies the control circuit 209 that the program information has been detected.

The decode circuit 205 decodes the program information detected by the program information detecting circuit 204.

The memory 206 stores a plurality of character data preset by the viewer by using the operation unit 108 and associated with the elapsed time for the viewed program.

The character generator 207 converts character data to video information according to the control signal output from the control circuit 209, and outputs video information obtained by the conversion to the combining circuit 208.

The combining circuit 208 combines the video information subjected to the video processing in the video amplifier circuit 201 with the character data converted to the video information in the character generator 207, and outputs a result to the video switching circuit 203.

The control circuit 209 conducts switching of video information output from the video switching circuit 203 to the CRT 106, a decision on the kind of demodulated program information obtained from the decode circuit 205, an output order for character data stored in the memory 206, outputting a control signal for controlling the output position of character data on the screen and so on to the character generator 207, outputting a control signal for controlling count start/interruption/resetting for the viewing elapsed time with respect to a program that the viewer is viewing for at least a certain time to the counter 210, outputting a recording/playing control signal to the program recording/playing circuit 202, storage of program information of a program for which counting for the selected time is conducted in the counter 210, a decision based on comparison between the program information of the program and the program information of the stored program input by the tuner 102, and sensing information input by the operation unit 108 and control according to the sensed information.

By the way, the program information includes at least one of information, such as date, the day of the week, program title, performer name, program genre, program start time, program end time, and channel number. Satisfaction of a requirement preset by the user by at least one of those kinds of information is used as one of conditions imposed on the counting for the selected time in the counter 210. Herein, information included in the program information in the present invention is not restricted to the above-described items, but other kinds of information concerning the program can be included.

When the user has turned on the receiving apparatus or switched the channels, the counter 210 starts measurement for the selected time of the selected channel. In the present embodiment, however, such a configuration that measurement is started only when the program information satisfies a predetermined condition is adopted. Furthermore, in the configuration of the present embodiment, when a certain program broadcasted on a certain selected channel has finished and a new program has been started, the measurement time is reset and measurement can be conducted again for the selected time of the new program.

The power supply circuit 211 includes a supply unit for supplying electric power to the tuner 102, the video unit 105, the data detection unit 107 and the control unit 109, which conduct TV broadcast wave inputting and character information detection/storage whether the power switch in the present TV receiving apparatus is on/off, and a supply unit for supplying electric power to other portions in synchronism with the turning on/off of the power switch.

With reference to FIG. 3, an example of data stored in the memory 206 in the TV receiving apparatus shown in FIG. 2 will now be described. FIG. 3 is a concept diagram of an example of data stored in the memory 206 in the TV receiving apparatus shown in FIG. 2.

With reference to FIG. 3, reference numeral 301 denotes a block for indicating No. of stored character data. Reference numeral 302 denotes a block for storing the viewing elapsed time until recording start.

As shown in FIG. 3, for example, character data "30 SECONDS BEFORE" is stored in the data of No. 1 and character data "1 MINUTE BEFORE" is stored in the data of No. 2. Character data "CANCELED" is stored in the data of No. n.

As a matter of course, character data other than those shown in FIG. 3 can be used as the stored character data in the present invention. Various kinds of information can be displayed to the user by storing various character data as shown in FIG. 3. It is also possible to adopt a configuration in which not only character data but also image data such as icons are stored and displayed.

Figure 4:
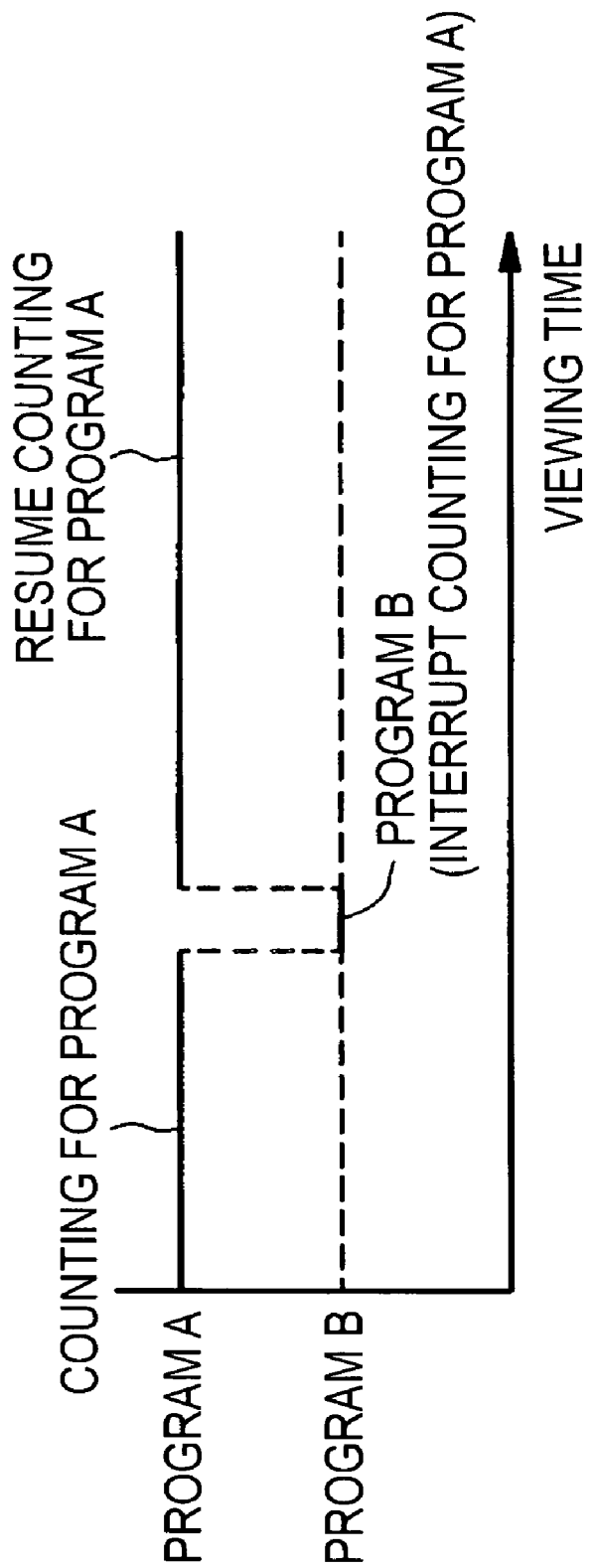
FIG. 4 is a concept diagram of an example of viewed program elapsed time in a counter 210 in the TV receiving apparatus shown in FIG. 1.

With reference to FIG. 4, an example of the viewed program elapsed time in the counter 210 in the TV receiving apparatus shown in FIG. 2 will now be described. FIG. 4 is a concept diagram of an example of the viewed program elapsed time in the counter 210 in the TV receiving apparatus shown in FIG. 2.

When a channel on which a program A is being broadcasted is set (when change from another channel to the channel is conducted, when a switch on the receiving apparatus is turned on with the channel set, or when a program broadcasted before broadcasting the program A is finished and the program A is started), the counter 210 starts counting to measure the viewing elapsed time for the program A. When the viewer switches to a program B while viewing the program A, the control circuit 209 compares the program information detected by the program information detecting circuit 204 with the stored program information, judges that the program information is different, and interrupts counting conducted by the counter 210 for the selected time with respect to the program A. And the counter 210 starts counting for the selected time with respect to the program B. Since the selected time for the program B is short and it is shorter than 10 minutes determined as a condition under which automatic recording is started in the present embodiment, recording of the program B is not started. By the way, the selected time for the program B is also stored in the memory 2000 in the same way. When the information content stored in the memory 2000 has exceeded a predetermined amount, however, the selected time for the program B is erased.

When switching to the program A has been conducted, the control circuit 209 conducts comparison on the program information and makes a decision in the same way. If it is recognized that the program information is the same, then the control circuit 209 resumes counting in addition to the selected time for the program A previously stored in the memory 2000 as the selected time for the program A.

With reference to FIG. 5, an example of a picture displayed on a screen of the CRT 106 in the TV receiving apparatus shown in FIG. 1 will now be described. FIG. 5 is a schematic diagram of a picture displayed on the CRT 106 in the TV receiving apparatus shown in FIG. 1.

FIG. 5(a) shows a display example obtained when the video information subjected to video processing in the video amplifier circuit 201 is displayed in a display area 501 on the CRT 106.

FIG. 5(b) shows a display example obtained when the character date stored in the memory 206 is output. Video information obtained by combining character data converted to video information with the video information subjected to video processing in the video amplifier circuit 201 is output to the display area 501 on the CRT 106. Here, character data 502 "1 MINUTE BEFORE" is displayed.

FIG. 5(c) shows a display example obtained when recording is suspended by the viewer. Video information obtained by combining character data converted to video information with the video information subjected to video processing in the video amplifier circuit 201 is output to the display area 501 on the CRT 106. Character data 503 "CANCELED" is displayed indicating that recording has been suspended.

An example of operation of a TV receiving apparatus to which an embodiment of a signal receiving apparatus according to the present invention has been applied will now be described.

For example, it is now supposed that the time period for which automatic recording is conducted is set to 22 o'clock to 24 o'clock, and recording of the program that the viewer is viewing is started when the viewing elapsed time since the viewing start time for the program has exceeded 10 minutes. It is also supposed that a recording start notice is given one minute before the start.

The control circuit 209 outputs a control signal to the counter 210 so as to conduct the counting for the viewing elapsed time from the viewing start time for the program.

Thereafter, the control circuit 209 always conducts detection (monitoring) to determine whether the viewer has conducted operation for suspending the recording or operation for changing the program to be received. If the selected time for the program A has reached 9 minutes, i.e., 1 minute before the automatic recording start is reached, then the control circuit 209 outputs a control signal to the memory 206 so as to transmit character data stored in the memory 206 to the character generator 207.

The character generator 207 converts the received character data to video information and transmits the video information to the combining circuit 208.

The combining circuit 208 combines the video information demodulated by the video amplifier circuit 201 with the video information from the character generator 207, and transmits video information obtained by the combining operation to the video switching circuit 203.

The control circuit 209 outputs a control signal to the video switching circuit 203 so as to output the video information obtained by combining operation in the combining circuit 208 to the CRT 106 serving as the perception generating device. As a result, the character information 502 "1 MINUTE BEFORE" as shown in FIG. 5(b) is displayed in the display area on the CRT 106.

If the viewer conducts operation to suspend the video recording, then the control circuit 209 outputs a control signal so as to transmit character data stored in the memory 206 to the character generator 207. The character data is converted to video information by the character generator 207. In addition, the control circuit 209 outputs a control signal to the character generator 207 so as to transmit the character data converted to the video information to the combining circuit 208.

Since the combining circuit 208 transmits the video information having the character data combined therewith to the video switching circuit 203, the character information 503 "CANCELED" as shown in FIG. 5(c) is displayed in the display area of the CRT 106.

Thereafter, the control circuit 209 outputs a control signal to the video switching circuit 203 so as to switch to the video information subjected to the video processing in the video amplifier circuit 201, and outputs a control signal to the counter 210 so as to reset the counting.

If the viewer does not conduct cancel operation after the character data for notifying the recording start is output, the control circuit 209 conducts detection to determine whether the viewing elapsed time since the program viewing start has exceeded 10 minutes.

When the viewing elapsed time has exceeded 10 minutes, the control circuit 209 outputs a control signal to the program recording/playing circuit 202 so as to start the recording, and the program recording/playing circuit 202 starts recording of the program the viewer is viewing.

The control circuit 209 conducts detection to determine whether end time for the program started in recording is already stored. If the end time is not stored, the control circuit 209 detects and stores program end time included in the program information. If the detected program end time is reached, the control circuit 209 outputs a control signal to the program recording/playing circuit 202 so as to finish the recording.

In the case where setting is conducted by the operation unit 108 so as to turn off electric power for functions other than a function concerning the recording, especially electric power concerning the display operation conducted by the CRT 106 serving as the perception generating device, after a fixed period of time has elapsed since the recording start time, the power supply circuit 211 conducts electric power supply for the function concerning the recording, for example, one minute after the start of the program recording. As a result, the display operation is finished.

It is now supposed that a commercial message is started while the viewer is viewing a program and the received program is changed. It is also supposed that the original program is selected again after the end of the commercial message. The control circuit 209 previously stores program information concerning the program for which counting is conducted in the counter 210. Each time the received program is changed, therefore, the control circuit 209 compares program information concerning the program after change with the stored program information. If the two kinds of program information coincide with each other, the control circuit 209 continues counting in the counter 210. If the two kinds of program information do not coincide with each other, the control circuit 209 outputs a control signal so as to make the counter 210 start counting for a new program.

With reference to FIGS. 6A, 6B and 6C, operation conducted by the control circuit 209 in the TV receiving apparatus shown in FIG. 1 as regards recording and character information outputting will be described. FIGS. 6A to 6C are flow charts of operation conducted by the control circuit 209 in the TV receiving apparatus shown in FIG. 1 as regards recording and character information outputting.

At S601, the control circuit 209 determines whether setting to the effect that a program the viewer is viewing for at least a fixed time should be recorded (automatic recording setting) has been conducted by the viewer. If the setting has been conducted, the control circuit 209 proceeds to S602. Otherwise, the control circuit 209 proceeds to EXIT.

At S602, the control circuit 209 determines whether the current time is within the time period for recording preset by the viewer. If the current time is within the time period for recording, the control circuit 209 proceeds to S603. Otherwise, the control circuit 209 proceeds to EXIT.

At S603, the control circuit 209 determines whether there is already reserved/one-touch recording setting. If reserved/one-touch recording is not set, the control circuit 209 proceeds to S604. Otherwise, the control circuit 209 proceeds to EXIT.

At S604, the control circuit 209 makes the counter 210 start the counting in order to accumulate the elapsed time for the program the viewer is viewing, and proceeds to S605.

At S605, the control circuit 209 conducts detection to determine whether the viewer has conducted operation for suspending the recording (automatic recording cancel operation). If the recording is not suspended, the control circuit 209 proceeds to S606. Otherwise, the control circuit 209 proceeds to EXIT.

At S606, the control circuit 209 conducts detection to determine whether the current time is the time when a notice that recording will be started should be given to the viewer. If the current time is the time when the notice should be given, the control circuit 209 proceeds to S607. Otherwise, the control circuit 209 returns to S605.

At S607, character data for notifying the recording start is displayed, and then the control circuit 209 proceeds to S608.

At S608, the control circuit 209 conducts detection to determine whether operation for suspending the recording has been conducted. If the recording is not suspended, the control circuit 209 proceeds to S609. Otherwise, the control circuit 209 proceeds to EXIT.

At S609, the control circuit 209 detects the viewing elapsed time for a program the viewer is viewing. If the detected viewing elapsed time has exceeded the viewing elapsed time preset by the viewer, the control circuit 209 resets the counter 210 and proceeds to S610. Otherwise, the control circuit 209 returns to S607.

At S610, the control circuit 209 causes recording of a program the viewer has viewed for at least a fixed time to be started, and then proceeds to S611.

At S611, the control circuit 209 conducts sensing to determine whether the end time of the program has been acquired from the program information under recording. If the end time has been acquired, the control circuit 209 proceeds to S612. Otherwise, the control circuit 209 returns to S611.

At S612, the control circuit 209 makes a decision whether the end time for the program under recording has been reached. If the end time is reached, the control circuit 209 proceeds to S613. Otherwise, the control circuit 209 returns to S612.

At S613, the control circuit 209 causes the recording of the program under recording to be finished, and proceeds to EXIT.

With reference to FIG. 7, operation conducted by the control circuit 209 in the TV receiving apparatus shown in FIG. 2 as regards the counter 210 at the time of channel switching will now be described. FIG. 7 is a flow chart of the operation conducted by the control circuit 209 in the TV receiving apparatus shown in FIG. 2 as regards the counter 210 at the time of channel switching.

At S701, the control circuit 209 determines whether the received program has been changed by the viewer. If the received program has been changed, the control circuit 209 proceeds to S702. Otherwise, the control circuit 209 proceeds to EXIT.

As S702, the control circuit 209 determines whether counting is being conducted for the viewing elapsed time with respect to the selected program before the change. If the counting is being conducted, the control circuit 209 proceeds to S703. Otherwise, the control circuit 209 proceeds to S704.

At S703, the control circuit 209 causes the counter 210, which has conducted counting for the viewing elapsed time with respect to the program before the change, to suspend the counting, stores the viewing elapsed time with respect to the program before the change in the memory 2000 as the viewed time of the program, and proceeds to S704.

At S704, the control circuit 209 reads out program information for the program after the change from a TV broadcast wave of a received program the viewer is viewing (after the change), and proceeds to S705.

At S705, the control circuit 209 determines whether program information for the program after the change is the same as program information of the program having a previous count value left in the memory 2000. If they are the same, the control circuit 209 proceeds to S706. Otherwise, the control circuit 209 proceeds to S707. At S707, the control circuit 209 starts counting for the viewing elapsed time with respect to the program after the change, and then proceeds to EXIT.

At S706, the control circuit 209 causes the counter 210 which has conducted counting for the viewing elapsed time with respect to the program the viewer is viewing, to resume counting for the viewing elapsed time with respect to the program, and then proceeds to EXIT.

According to the present embodiment, recording is started when the selected time for the reception subject has exceeded a predetermined time as heretofore described. When the viewer has fallen asleep while the viewer is viewing a long drama or the like, or when the viewer has failed to conduct one-touch recording because of a sudden telephone call or visitor, therefore, recording of a program the viewer has viewed for at least a fixed time is automatically started. This results in an effect that the viewer can enjoy the drama the viewer desires to watch, to the end. Since in the embodiment not only the channel information is sensed but also program information is sensed and used, recording start can be controlled by taking a program as the unit.

By giving advance notice before starting recording, recording can be suspended when the viewer is watching TV on time and this brings about an effect that wasteful video recording is prevented.

In addition, end time of a program is read out from program information superposed on a TV broadcast wave or program information received separately. Even when the viewer loses himself or herself in the talk over the telephone or with a visitor and forgets that recording is being conducted or the viewer falls asleep while the viewer is viewing the program, therefore, recording is also finished simultaneously with the program end without especially setting the end time. This brings about an effect that unnecessary programs broadcasted after the end of the desired program can be prevented from being recorded. Furthermore, after a fixed time has elapsed since recording was started, electric power is supplied only to the function required for recording. Therefore, power consumption can be reduced. If setting is conducted so as to conduct recording in a time period at midnight when the viewer becomes sleepy or in the evening when the viewer is busy in doing housework, then a favorite program in a favorite time period can be recorded when the viewer has viewed for at least a fixed time, resulting in an effect.

In the present embodiment, character data is used to give advance notice concerning recording. However, icons such as figures or characters may also be displayed. Or advance notice concerning the start of automatic video recording may be given by using a sound, an LED (Light Emitting Diode) or the like.

As one of conditions under which the video recording is started, viewing elapsed time since the start of viewing is used. However, the total ratio of viewing time to televising time of the program may also be detected.

In the embodiment described above concretely, program information is acquired and selected time is measured for each program. However, this is not indispensable. It is also possible to measure selected time of a channel since the channel is selected and record a signal broadcasted on the channel when the selected time has exceeded a predetermined time. In this case, recording is finished when the capacity of the recording device has become full or a preset recording time has elapsed.

In the embodiment described above concretely, television broadcasting has been taken as an example. However, the present invention can be implemented in a radio broadcast receiving apparatus as well in the same way. In a configuration, such as a video-on-demand system used via a network, in which the user can select a reception subject, the present invention can be suitably implemented.

According to the present invention, even if the user cannot order the recording start, a signal having a high possibility of necessity of being recorded can be recorded.

What is claimed is:

1. A broadcast signal receiving apparatus comprising:
   a selection circuit for selecting a channel in a received broadcast signal;
   a recording device that is capable of recording a program broadcasted on the selected channel selected by the selection circuit;
   an operation unit for setting an elapsed time threshold that is compared to a selected time period during which the channel broadcasting the program is selected by the selection circuit, in order for the program to be recorded automatically;
   a control unit for performing control with regard to measuring the selected time period and recording the program; and
   a memory unit for storing the selected time period measured by the control unit,
   wherein the control unit (a) measures a selected time period during which the channel broadcasting the program is selected while correlating the selected time period with program information of the program in a case where the selection circuit selects the channel, (b) interrupts measuring the selected time period while storing the selected time period into the memory unit in a case where the selected channel is changed to another channel and restarts the measurement in a case where the channel is selected again so as to view a program relating to the selected time period stored in the memory unit, and (c) performs control to record the program broadcasted on the selected channel on the recording device in a case where the measured time period exceeds the elapsed time threshold set via the operation unit.

2. A broadcast signal receiving apparatus according to claim 1, wherein the operating unit is capable of setting a period of time in which the control unit performs control to record the program automatically, and
   wherein the control unit, in the period of time set via the operating unit, measures a time period during which the channel is selected in a case where the selection circuit selects the channel, and performs control to record the program broadcasted on the selected channel on the recording device in a case where the measured time period exceeds the elapsed time threshold set via the operation unit.

3. A broadcast signal receiving apparatus according to claim 1, further comprising:
   a character output unit for displaying character information on a display unit for displaying an image,
   wherein the control unit controls the character output unit such that character information which represents advance notice concerning the start of the recording is displayed on the display unit.

4. A broadcast signal receiving apparatus according to claim 1, wherein the control unit does not perform control to record the program in a case where a viewer performs an operation for canceling or recording before the measured time period exceeds the elapsed time threshold.

5. A broadcast signal recording method comprising:
   a process for selecting a channel in a received broadcast signal; and a process for setting an elapsed time threshold;
a process for measuring a selected time of the selected channel; and
a process for recording a program broadcasted on the selected channel, in a case where the selected time exceeds the elapsed time threshold,
wherein the selected time of the selected channel is measured while correlating the selected time with program information of a program which the channel is broadcasting,
wherein in a case where the selected channel is changed to another channel, the measurement of the selected time is interrupted and the measured time is stored into a memory unit, and
wherein in a case where the channel is selected again so as to view a program relating to the selected time stored in the memory unit, the measurement of the selected time is restarted.

6. A broadcast signal recording method according to claim 5, further comprising:
a process for setting a period of time in which the control of automatically recording a program is performed,
wherein the process for recording a program is performed only during the set period of time.

7. A broadcast signal recording method according to claim 5, further comprising:
a process for displaying character information which represents advance notice concerning the start of the recording.

8. A broadcast signal recording method according to claim 5, wherein the process for recording the program is not executed in a case where a viewer performs an operation for canceling recording before the measured time period exceeds the elapsed time threshold.

* * * * *

UNITED STATES PATENT AND TRADEMARK OFFICE
CERTIFICATE OF CORRECTION

| | |
|---|---|
| PATENT NO. | : 7,369,744 B2 |
| APPLICATION NO. | : 10/686571 |
| DATED | : May 6, 2008 |
| INVENTOR(S) | : Toshiharu Tobiishi |

Page 1 of 1

It is certified that error appears in the above-identified patent and that said Letters Patent is hereby corrected as shown below:

ON THE TITLE PAGE, AT ITEM (56) References Cited,
U.S. PATENT DOCUMENTS:
--6,038,367 *   3/2000 Abecassis-- should be inserted.

COLUMN 14:
Line 67, "and" should be deleted.

Signed and Sealed this

Ninth Day of December, 2008

JON W. DUDAS
*Director of the United States Patent and Trademark Office*